United States Patent
Tseng et al.

(10) Patent No.: US 10,284,518 B2
(45) Date of Patent: May 7, 2019

(54) NETWORK SYSTEM WITH SEAMLESS HANDOVER MECHANISM, OPERATION METHOD AND CONTROL APPARATUS THEREOF

(71) Applicant: National Chiao Tung University, Hsinchu (TW)

(72) Inventors: Chien-Chao Tseng, Hsinchu (TW); Chia-Lin Chuo, Changhua (TW); Ting-Hsuan Hsieh, Toufen (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 34 days.

(21) Appl. No.: 15/617,745

(22) Filed: Jun. 8, 2017

(65) Prior Publication Data

US 2018/0192341 A1 Jul. 5, 2018

(30) Foreign Application Priority Data

Dec. 30, 2016 (TW) .............................. 105144051 A

(51) Int. Cl.
  *H04L 29/12* (2006.01)
  *H04W 36/00* (2009.01)
  *H04W 8/08* (2009.01)

(52) U.S. Cl.
  CPC ........ *H04L 61/6022* (2013.01); *H04L 61/103* (2013.01); *H04W 8/08* (2013.01); *H04W 36/0033* (2013.01)

(58) Field of Classification Search
  CPC . H04W 36/0011; H04W 36/14; H04W 36/18; H04W 36/385; H04W 8/08;
  (Continued)

(56) References Cited

U.S. PATENT DOCUMENTS

2002/0193116 A1* 12/2002 Agrawal ........... H04L 29/12018
                                                    455/445
2005/0074015 A1*  4/2005 Chari .................. H04L 12/2856
                                                    370/400
(Continued)

OTHER PUBLICATIONS

Li Jun Zhang, et al. "An enhanced fast handover with seamless mobility support for next-generation wireless networks". Journal of Network and Computer Applications, 46(2014)322-335.
(Continued)

*Primary Examiner* — Michael Thier
*Assistant Examiner* — Prince A Mensah
(74) *Attorney, Agent, or Firm* — Muncy, Geissler, Olds & Lowe, P.C.

(57) ABSTRACT

A network system based on a SDN with a seamless handover mechanism, an operation method and a control apparatus thereof are provided. The network system includes network devices, host devices and a control apparatus. The network devices are connected together. A part of the network devices are equipped with wireless access networks of the same SSID, and each of the host devices is connected to one of the network devices. The control apparatus is connected to the network devices. When a first host device of the host devices is changed to connect with a second network device from a first network device, the control apparatus controls the network devices to return an address resolution response packet to the first host device in response to an address resolution request packet transmitted from the first host device, so as to maintain an IP address of the first host device.

10 Claims, 8 Drawing Sheets

(58) Field of Classification Search
CPC .. H04W 36/0033; H04L 61/10; H04L 61/103; H04L 61/1511; H04L 61/6022
See application file for complete search history.

(56) References Cited

U.S. PATENT DOCUMENTS

| | | |
|---|---|---|
| 2015/0208321 A1 | 7/2015 | Sane et al. |
| 2015/0326524 A1* | 11/2015 | Tankala ............... H04L 61/103 709/245 |
| 2016/0095019 A1* | 3/2016 | Cui .................. H04W 36/0011 370/331 |
| 2018/0184345 A1* | 6/2018 | Likar .................... H04W 36/08 |

OTHER PUBLICATIONS

Kyoung-Hee Lee. "Mobility Management Framework in Software Defined Networks". International Journal of Software Engineering and Its Applications, vol. 8, No. 8 (2014), pp. 1-10.
Wei-Wen Chen, et al. "SDN-enabled Session Continuity for Wireless Networks". IEEE ICC 2017 SAC Symposium SDN & NFV Track' 2017, pp. 1-6.

* cited by examiner

NETWORK SYSTEM WITH SEAMLESS HANDOVER MECHANISM, OPERATION METHOD AND CONTROL APPARATUS THEREOF

This application claims priority for Taiwan patent application no. 105144051 filed on Dec. 30, 2016, the content of which is incorporated by reference in its entirely.

FIELD OF THE INVENTION

The present invention relates to a software-defined network (SDN)-based network system, an operation method and a control apparatus thereof, particularly to a network system with a seamless handover mechanism, an operation method and a control apparatus thereof

BACKGROUND OF THE INVENTION

An ordinary network infrastructure includes a plurality of network devices connected together in a wired or wireless way. The wireless way may be an Ad-hoc network mode, a mesh mode, or another mode. In the situation of a wireless network, the network infrastructure includes a plurality of wireless access devices enabling the host devices to access networks wirelessly. The wireless access devices may be also connected with the rear-end routers, transmitting the packets output by the host devices through the routers. In order to administer the network conveniently, the administrator usually divides the network into many subnetworks. The host device will connect with one subnetwork, using the Internet protocol address (IP address) of the subnetwork. While roaming to a new subnetwork, the host device must assume the IP address of the new subnetwork for Internet access.

On the other side, a host device may turn from the original network device to connect with a new network device. If the new network device and the original network device respectively belong to different subnetworks, a series of handover procedures must be undertaken to hand over the host device to the new network device. The aforementioned handover procedures include a Layer-3 handover operation. In the Layer-3 handover operation, the host device maybe request a new IP address from the new network device to update the IP address and maintain the network connectivity.

An IP address had two functions. The first function is to act as the basis of routing. In other words, while a host device moves to a different subnetwork, the IP address of the host device would change so that the packets can be correctly transferred. The second function is to act as the endpoint identifier of the transport layer and the application layer. In the case of transmission control protocol (TCP) session, two sets of network sockets are used as the basis of network connection. A socket is formed by an IP address and a TCP port. Once the IP address or the TCP port of either socket set changes, the TCP session connection would be interrupted.

Therefore, it is a target of the technicians in the field to provide a network system and a related operation method, which have a better handover mechanism, to achieve seamless handover and decrease the time spent in handover procedures.

SUMMARY OF THE INVENTION

The present invention provides an SDN-based network system with a seamless handover mechanism, an operation method and a control apparatus thereof, which have a better handover mechanism able to decrease the time spent in handover procedures and reduce the probability of packet loss in handover procedures.

In one embodiment of the present invention, the present invention provides an SDN-based network system with a seamless handover mechanism. The network system comprises a plurality of network devices, a plurality of host devices, and a control apparatus. The network devices interconnect to form a network infrastructure. A portion of the network devices provide a wireless network access function enabling the host devices to connect with the network devices in a wireless way. The wireless access networks provided by a portion of network devices need an identical service set identifier (SSID). Each of the host devices connects one of the network devices through the wireless access networks. The control apparatus connects with the network devices. While a first host devices of the host devices turns from a first network device of the network devices to link with a second network device, the control apparatus controls the network device to return the address resolution response packet to the first host device corresponding to the address resolution request packet sent out by the first host device so as to maintain the IP (Internet Protocol) address of the first host device.

In one embodiment of the present invention, the control apparatus establishes a flow table of the network devices of the SDN-based network system and changes the flow entries in the flow table to dynamically adjust the transmission path of data packets or message packets, whereby to maintain better transmission efficiency. The present invention does not adopt the anchor point device, such as that in PMIPv6, exempted from establishing network tunnels. The present invention uses the control apparatus to arrange better paths.

In one embodiment of the present invention, the abovementioned network devices include an external-connection router device linking to external networks. While the target IP address of a packet is an IP address of an external network, the network device transmits the packet to the external-connection router device, and the external-connection router device transmits the packet to the external network.

In one embodiment of the present invention, while the abovementioned control apparatus receives the address resolution request packet from the second network device, the control apparatus determines whether the source IP address of the address resolution request packet is the IP address of the first host device. Alternatively, the control apparatus determines whether the source media access control (MAC) address of the packet is the MAC address of the first host device. If the source IP address of the address resolution request packet is the IP address of the first host device or the source MAC address of the packet is the MAC address of the first host device, the control apparatus determines whether the target IP address, which is to be resolved, of the address resolution request packet is the IP address of a network device or host device of the first network. If the target IP address, which is to be resolved, in the address resolution request packet is the IP address of a network device or host device of the first network, the control apparatus finds out the MAC address corresponding to the target IP address that is to be resolved and places the found out MAC address in an address resolution response packet. Then, the control apparatus returns the address resolution response packet to the first host device through the second network device.

In one embodiment of the present invention, while the abovementioned control apparatus receives another address resolution request packet through a first network device, the control apparatus determines whether the target IP address, which is to be resolved, of the another address resolution request packet is the IP address of the first host device. At this time, the first host device may have roamed to a second network. If the target IP address, which is to be resolved, of the another address resolution request packet is the IP address of the first host device, the control apparatus places the MAC address of the first host device in another address resolution response packet. The control apparatus returns the another address resolution response packet to the host device or network device in the first network through the first network device.

In one embodiment of the present invention, while returning the address resolution response packet to the first host device, the control apparatus correspondingly updates the flow tables of all the network devices, whereby to guide all the packets going to the first host device to the first host device in the second network.

In one embodiment of the present invention, while returning another address resolution response packet to the first network, the control apparatus correspondingly updates the flow tables of all the network devices, whereby to transmit the packets going to the first host device to the first host device having roamed to the second network.

One embodiment of the present invention provides an operation method of a network system. The network system includes a plurality of network devices, a plurality of host devices and a control apparatus. The network devices interconnect in a wired or wireless way to form a network infrastructure. A portion of the network devices provide wireless access networks. The wireless access networks have an identical service set identifier (SSID). Each of the host devices connects with one of the network devices providing wireless access networks through the wireless access networks. The control apparatus connects with the network devices. The operation method comprises the following steps: while a first host device of the host devices turns from a first network device of the network devices to connect with a second network device, the first host device sends out an address resolution request packet; corresponding to the address resolution request packet, the control apparatus controls the network device to return an address resolution response packet to the first host device, whereby to keep the IP address of the first host device.

One embodiment of the present invention provides a control apparatus applicable to a network system. The network system includes a plurality of network devices and a plurality of host devices. The network devices interconnect. A portion of the network devices provide wireless access networks. The wireless access networks have an identical service set identifier (SSID). Each of the host devices connects with one of the network devices providing wireless access networks through the wireless access networks. The control apparatus includes a network unit and a processor. The network devices connect with the network unit. The processor is coupled to the network unit. While a first host device of the host devices turns from a first network device of the network devices to connect with a second network device, the processor, corresponding to the address resolution request packet sent out by the first host device, controls the network device to return an address resolution response packet to the first host device, whereby to keep the IP address of the first host device.

Based on the abovementioned technical schemes, the present invention provides a network system with a seamless handover mechanism, an operation method and a control apparatus thereof, wherein the network system is programmed to make all the wireless access networks of the network devices connecting with the network system have an identical service set identifier (SSID). While the host device is roaming among wireless networks, the IP address of the host device must be unchanged before and after movement to maintain session continuity and achieve seamless handover. In one embodiment, while a host device turns from an originally-connected network device to connect with another network device, the control apparatus, corresponding to the address resolution request packet issued by the host device, controls the network device to return an address resolution response packet to the host device so as to maintain the IP address of the host device.

Thus, the handover process undertaken by the host device is exempted from the Layer-3 handover activity. Therefore, the time spent in the handover process is decreased.

Below, embodiments are described in detail in cooperation with the attached drawings to make the characteristics and advantages of the present invention easily understood.

DETAILED DESCRIPTION OF THE PREFERRED EMBODIMENTS

It should be explained beforehand for the numeral notations used in the specification: the symbol "~" is used to indicate a range, and the symbol "-" is used between numbers to indicate a member of a group. For example, 120-1 is used to indicate that 120-1 is a first member of the group 120; 120-1~120-4 is used to indicate a range of members in the group 120, including "120-1, 120-2, 120-3 and 120-4.

Figure 1:
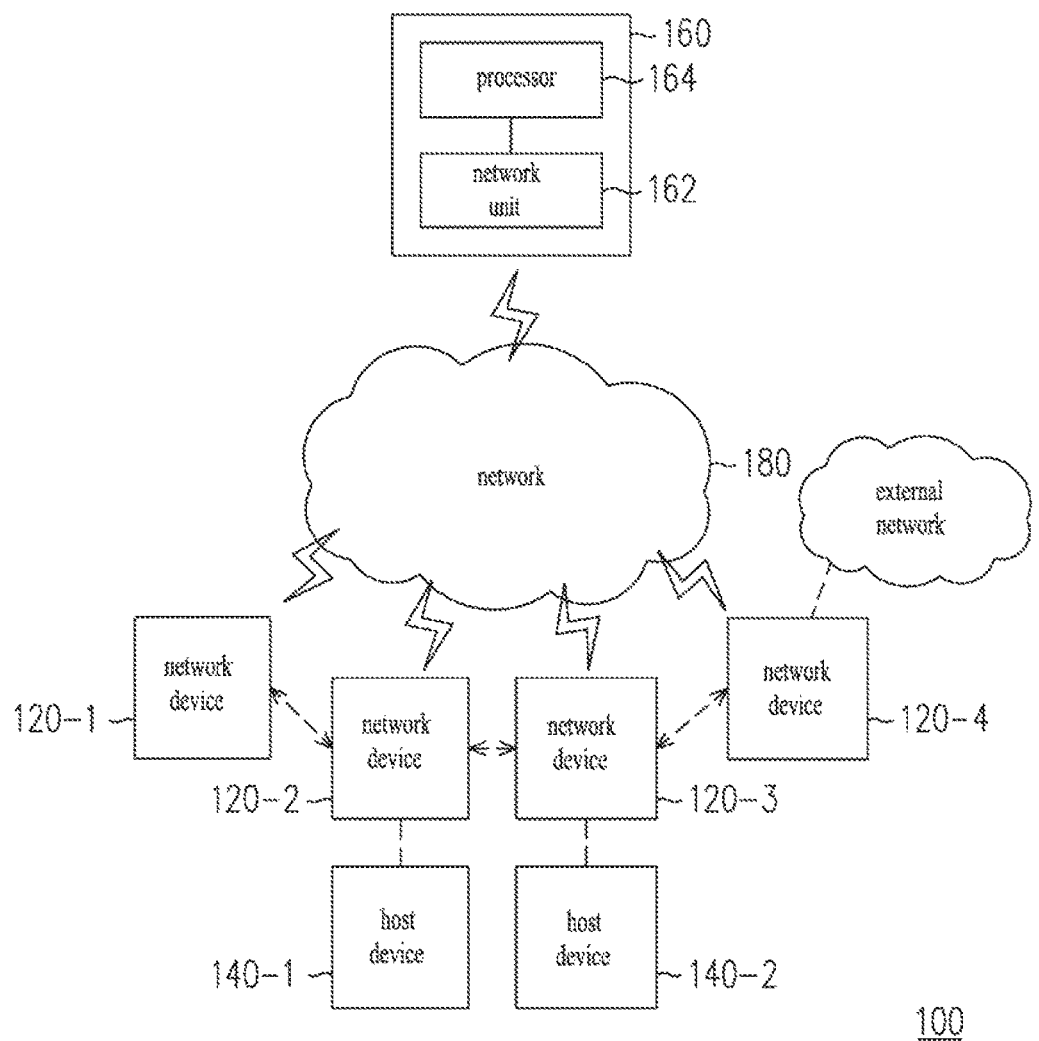
FIG. 1 is a diagram schematically showing a network system according to one embodiment of the present invention.

Refer to FIG. 1 a diagram schematically showing a network system according to one embodiment of the present invention. The network system 100 comprises a plurality of network devices 120-1~120-4, a plurality of host devices 140-1~140-2, and a control apparatus 160. The network devices 120-1~120-4, the host devices 140-1~140-2 and the control apparatus 160 comprise hardware. The network devices 120-1~120-4 interconnect. Each of the host devices 140-1~140-2 connects with one of the network devices 120-1~120-4. In the embodiment shown in FIG. 1, the host device 140-1 connects with the network device 120-2, and the host device 140-2 connects with the network device 120-3. It should be noted: the host devices and the network devices are not limited to be the network devices 120-1~120-4 and the host devices 140-1~140-2 of the embodiment shown in FIG. 1. In the present invention, the quantity of the host devices and the quantity of the network devices may be adoptable according to practical application.

In the embodiment shown in FIG. 1, the control apparatus 160 links to the network devices 120-1~120-4 through the network 180. The network 180 is established by interconnecting a plurality of networks devices (not shown in the drawings). In the embodiment shown in FIG. 1, the control apparatus 160 at least includes a network unit 162 and a processor 164. The network unit 162 is a communication device supporting various wireless communication standards, such as Bluetooth, WiFi, WiMax, NFC (Near Field Communication), LTE (Long Term Evolution), and Wi-Fi. The processor 164 is coupled to the network unit 162. The processor 164 may be a system-on-chip (SOC), an application processor, a media processor, a microprocessor, a central processing unit (CPU), a digital signal processor, or the like. The network unit 162 links to the network 180. The network devices 120-1~120-4 connect with the network unit 162 through the network 180.

In the embodiment shown in FIG. 1, the network devices 120-1~120-4 have a plurality of connection interfaces, such as routers, switches, wireless access points, gateways or servers, to realize the function of routing packets. However, the present invention does not limit that the connection interfaces must be the abovementioned devices. In other embodiments, the network devices 120-1~120-4 are electronic devices having a packet-routing function, such as personal digital assistants, smart mobile devices, notebooks, tablet computers or desktop computers. Further, the network devices 120-1~120-4 may be a combination of the abovementioned devices, such as a combination of wireless access points and switches. However, the present invention neither limits that the network device must be one of the abovementioned devices nor limit that the network devices must be a combination of the abovementioned devices.

It should be explained particularly: a portion of the network devices of the network system provide wireless access functions; another portion of the network devices do not provide wireless access functions. In detail, the network devices providing wireless access functions are located around the periphery of the network, providing wireless access functions for the host devices intending to link with the network. On the other side, the network devices purely used as router devices play the role of the network backbone and function to transfer packets. In the embodiment shown in FIG. 1, the network devices 120-2 and 120-3 can provide the wireless access functions and directly link with the host devices 140-1 and 140-2 wirelessly. Alternatively, the network devices 120-2 and 120-3 can indirectly link with the host devices 140-1 and 140-2 through other wireless access devices providing wireless access functions. However, the present invention does not limit that the network devices should link with the host devices directly or indirectly. In order to explain the present invention clearly and concisely, the example will be used to exemplify the preset invention below: the network devices 120-1~120-4 provide wireless access functions, and the wireless access networks providing the wireless access functions have an identical SSID. However, the present invention is not limited by the example.

Figure 2:
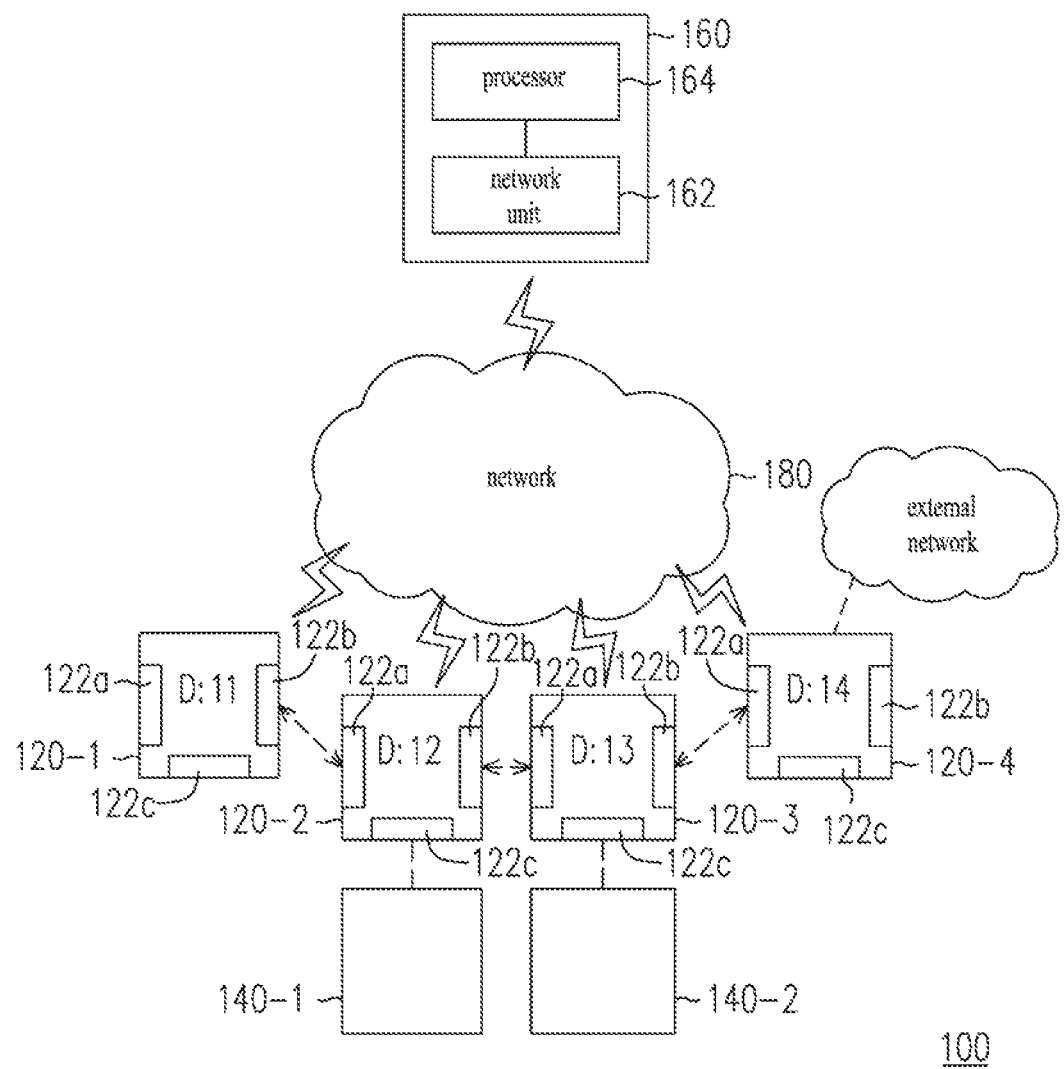
FIG. 2 is a diagram schematically showing network devices according to one embodiment of the present invention.

Refer to FIG. 2 a diagram schematically showing the network devices according to one embodiment of the present invention. In FIG. 2, each of the network devices 120-1~120-4 has a first connection interface 122a, a second connection interface 122b and a third connection interface 122c. The first connection interface 122a, the second connection interface 122b and the third connection interface 122c are respectively connection interfaces supporting various wireless communication standards and various wired communication standards.

In one embodiment, the interconnection of the network devices 120-1~120-4 is based on a first communication protocol. The first communication protocol includes a Wi-Fi Direct (Wireless Fidelity Direct) communication protocol. While the interconnection of the network devices 120-1 and 120-2 is based on the Wi-Fi Direct communication protocol, the second connection interface 122b of the network device 120-1 connects with the first connection interface 122a of the network device 120-2. In another embodiment, the first connection interface 122a of the network device 120-1 connects with the second connection interface 122b of the network device 120-2. Herein, the first connection interface 122a is the owner-end interface of the Wi-Fi Direct communication protocol, and the second connection interface 122b is the client-end interface of the Wi-Fi Direct communication protocol. It should be noted: the abovementioned first communication protocol is not limited to be the Wi-Fi Direct communication protocol but may be another communication protocol.

In one embodiment, the network devices 120-1~120-4 include an external-connection router device. For example, the network device 120-4 is an external-connection router device. The external-connection router device (the network device 120-4) connects with external networks. The host devices 140-1~140-2 are electronic devices able to link with the network, such as personal digital assistants, smart mobile devices, notebooks, tablet computers or desktop computers. In this embodiment, each of the host devices 140-1~140-2 can link with the network devices 120-1~120-4.

In one embodiment, the network devices 120-1~120-4 provide wireless access functions; the wireless access networks of the network devices 120-1~120-4, which the host devices 140-1~140-2 link to, have an identical SSID. In case of the host device 140-1 and the network device 120-2 in FIG. 2, while linking to the network system 100 at the first time, the host device 140-1 links to the third connection interface 122c of the network device 120-2. The network device 120-2, which the host device 140-1 links to, issues an IP address to the host device 140-1 correspondingly. Alternatively, another network device, which links to the network device 120-2, issues an IP address to the host device 140-1 correspondingly.

In one embodiment, the control apparatus 160 is a control apparatus of a software-defined network (SDN) and links to the network devices 120-1~120-4 based on the Openflow Protocol. In other words, the network 180 is a software-defined network. However, the present invention is not limited by the embodiment. In the SDN environment, the processor 164 of the control apparatus 160 can dynamically adjust the transmission routes of data packets or message packets via setting the flow tables of the network devices 120-1~120-4 of the software-defined network and varying the flow entries of the flow tables, whereby to avoid network congestion and maintain transmission efficiency. In detail, the flow entry records the related information of the packet (including the source IP address, the source MAC address, the target IP address, and the target MAC address of the packet) and the corresponding operation rules. According to the flow entries of the flow tables, the network devices 120-1~120-4 perform corresponding activities on the received packets, such as transferring the received packets to the host devices 140-1~140-2 or other network devices 120-1~120-4, or submitting the received packets to the control apparatus 160. It should be noted: if the flow table does not have any operation rule corresponding to the packet received by one of the network devices 120-1~120-4, the network device will query the control apparatus 160 through the network 180. In other words, the control apparatus 160 sets a plurality of flow rules in the network devices 120-1~120-4 for establishing the routes of transferring packets; the network devices 120-1~120-4 look up the flow tables to determine how to transfer packets.

Figure 3:
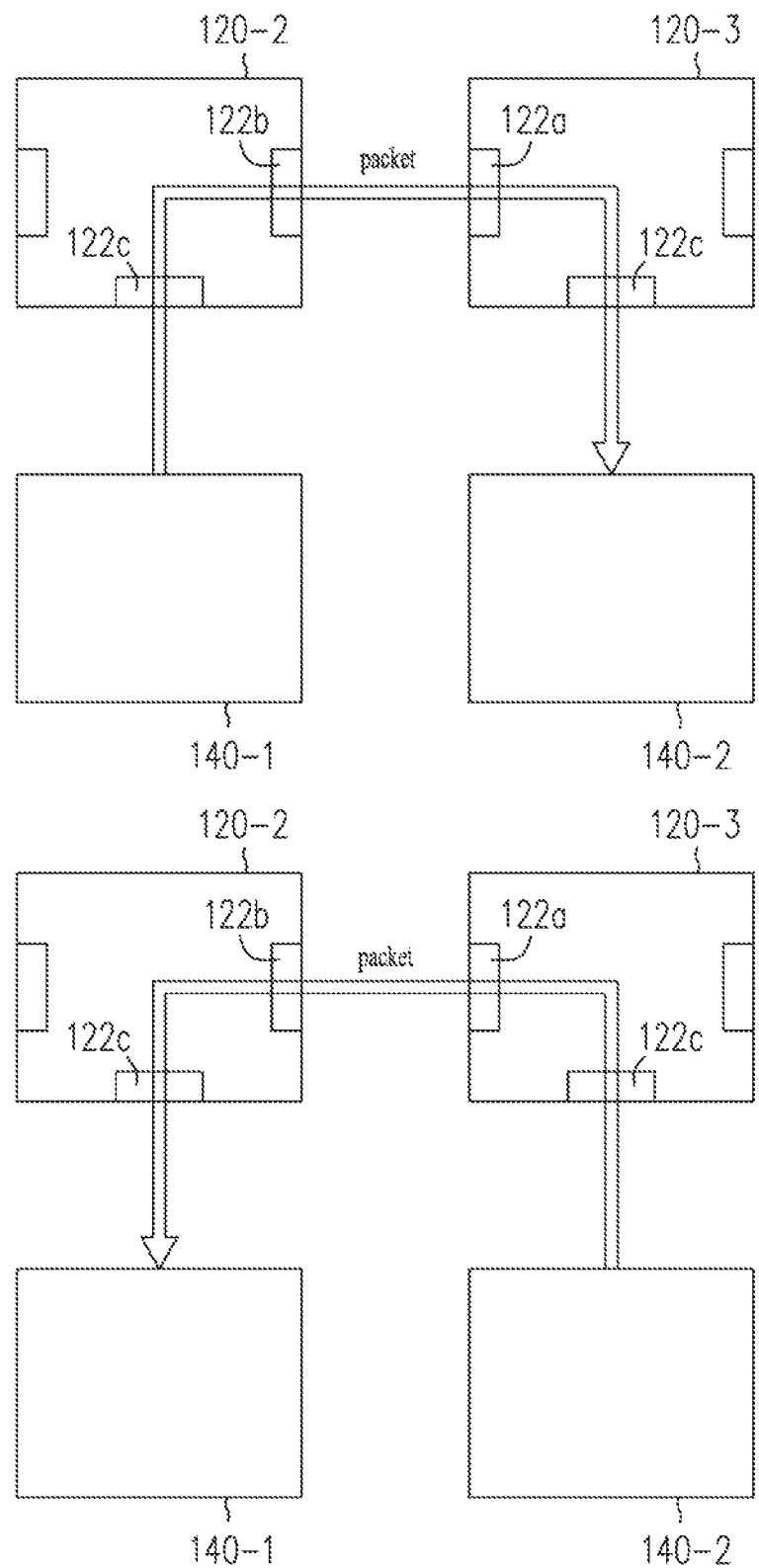
FIG. 3 is a diagram schematically showing packet transmission according to one embodiment of the present invention.

Refer to FIG. 3 a diagram schematically showing packet transmission according to one embodiment of the present invention. In FIG. 3, while the host device 140-1 sends a packet to the host device 140-2, the source IP address of the packet is the IP address of the host device 140-1, and the target IP address of the packet is the IP address of the host device 140-2. After receiving the packet through the third connection interface 122c, the network device 120-2 transfers the packet through the second connection interface 122b to the first connection interface 122a of the network device 120-3 according to the flow table established in the control apparatus 160. The network device 120-3 looks up the flow table and then transfers the packet through the third connection interface 122c to the host device 140-2.

In one embodiment, while the host device 140-2 sends a packet to the host device 140-1, the source IP address of the packet is the IP address of the host device 140-2, and the target IP address of the packet is the IP address of the host device 140-1. After receiving the packet through the third connection interface 122c, the network device 120-3 transfers the packet through the first connection interface 122a to the second connection interface 122b of the network device 120-2 according to the flow table. The network device 120-2 looks up the flow table and then transfers the packet through the third connection interface 122c to the host device 140-1.

It should be noted: in one embodiment, if the interconnection of the network devices 120-1~120-4 is based on the Wi-Fi communication standard or the Wi-Fi Direct communication standard, the source MAC address of the packet varies with the device or connection interface, which sends out or transfers the packet, in the transmission process, but the source IP address of the packet is maintained to be the IP address of the original device issuing the packet. However, the present invention is not limited by the embodiment. In one embodiment, suppose the first connection interface 122a of the network device 120-3 and the second connection interface 122b of the network device 120-2 work under the STA (Station) mode of the Wi-Fi communication standard or the Wi-Fi Direct communication standard; if the first connection interface 122a is the owner-end interface and the second connection interface 122b is the client-end interface, the second connection interface 122b only receives the packet whose target MAC address is exactly the MAC address of the second connection interface 122b itself.

In the embodiment shown in FIG. 3, under the Wi-Fi communication standard or the Wi-Fi Direct communication standard, before the first connection interface 122a of the network device 120-3 sends out the packet, the target MAC address of the packet, which is corresponding to the target IP address of the packet, needs to be modified to be the MAC address of the second connection interface 122b of the network device 120-2. Contrarily, the first connection interface 122a, which functions as the owner-end interface, is free from the abovementioned limitation while receiving the packet. In other words, once all the first connection interfaces 122a and second connection interfaces 122b of the network devices 120-1~120-4 work under the STA mode of the Wi-Fi communication standard or the Wi-Fi Direct communication standard, the abovementioned rule of modifying the MAC address of the packet has to apply to all the network devices 120-1~120-4.

Refer to FIG. 1 and FIG. 3 again. In the embodiment shown in FIG. 1 and FIG. 3, if the host device 140-1 issues a packet to a device in an external network, the target IP address of the packet is an IP address of the external network. Because the network device 120-4 for connection with an external network, i.e. the external-connection router device, is normally fixed, packet transmission will be done as long as the network devices 120-1~120-4 can correctly guide the packet. After receiving the packet, the network device 120-4 further transfers the packet to the external network. Similarly, while the target IP address of a packet from an external network is the IP address of the host device 140-1, the network system 100 determines the network device that the host device 140-1 links to, such as the network device 120-2. Then, packet transmission will be done correctly by the network devices 120-1~120-4.

Under the abovementioned conditions, while the host device 140-1 or 140-2 turns from the original network device to connect with another network device (for example, the host device 140-1 turns from the network device 120-2 to connect with the network device 120-1), the network system 100 can maintain the IP address of the host device 140-1 or 140-2 unchanged via the assistance of the control apparatus 160, whereby to decrease the time consumed in the handover process and reduce the probability of packet loss.

Figure 4:
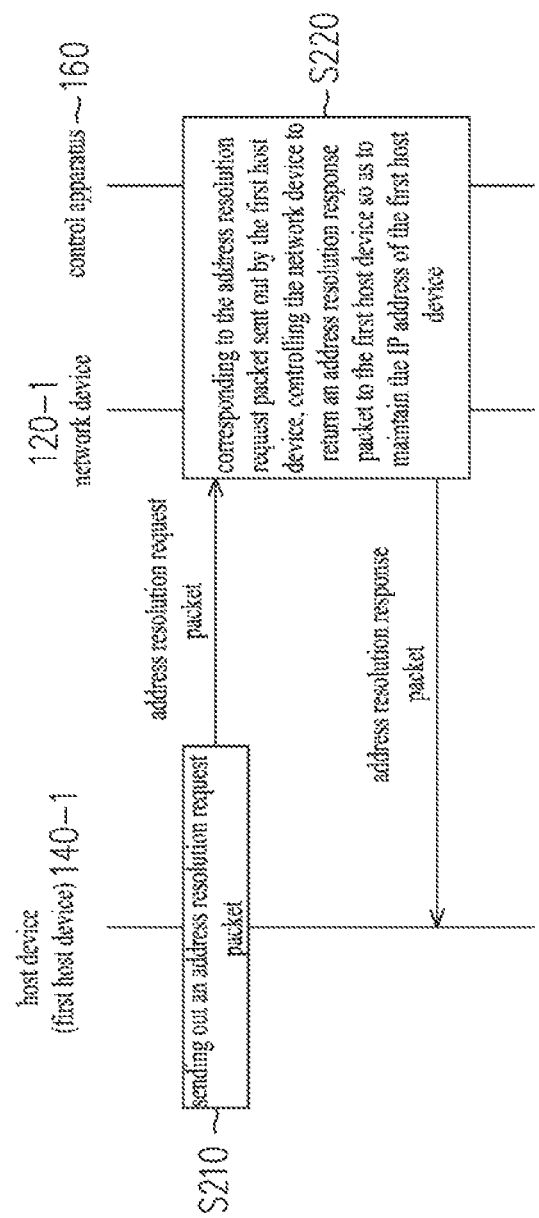
FIG. 4 is a flowchart of an operation process of a network system according to one embodiment of the present invention.
Figure 5:
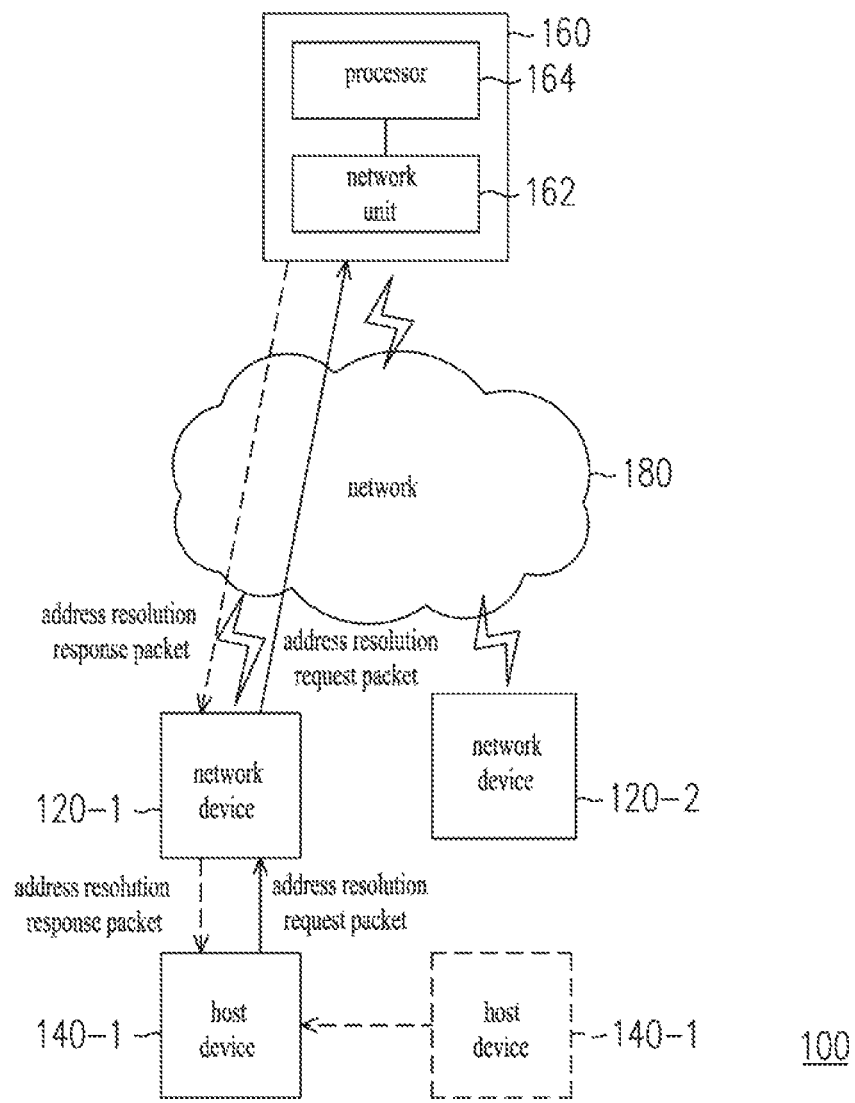
FIG. 5 is a diagram schematically showing operation of a network system according to one embodiment of the present invention.

FIG. 4 is a flowchart of the operation process of the network system according to one embodiment of the present invention. FIG. 5 is a diagram schematically showing the operation of the network system according to one embodiment of the present invention. Refer to FIG. 4 and FIG. 5. While the host device 140-1 (a first host device) of the host devices 140-1~140-2 turns from the network device 120-2 (a first network device) of the network devices 120-1~120-4 to connect with the network device 120-1 (a second network device), the host device 140-1 sends out an address resolution request packet (Step S210). Corresponding to the address resolution request packet sent out by the first host device 140-1, the processor 164 of the control apparatus 160 controls the network devices 120-1~120-4 to return an address resolution response packet to the host device 140-1 so as to maintain the IP address of the host device 140-1 (Step S220).

The embodiment shown in FIGS. 1-5 is further used to demonstrate the present invention in detail. While the host device 140-1, which originally connects with the network device 120-2, turns to connect with the network device 120-1, i.e. while the host device 140-1 moves from the first network of the network device 120-2 to the second network of the network device 120-1, the host device 140-1 recognizes that the connected object is changed and sends an address resolution request packet to the network device 120-2. In the embodiment, the address resolution request packet is an ARP (Address Resolution Protocol) request packet. Ordinarily, an address resolution request packet can only be transmitted in the Layer-2 network, such as a local area network or the same subnetwork. The network device 120-1 and the network device 120-2 are respectively located in different subnetworks. Hence, the network device 120-1 will block the address resolution request packet unless the network device has been programmed specially. Thus, the address resolution request packet cannot be sent out. In such a case, the host device 140-1 will undertake a Layer-3 handover activity. However, if the network device 120-1 is an Openflow-based router device in a software-defined network, the network device 120-1 is able to flood ARP packets out, and it is possible for the host device 140-2 to receive and response the ARP packet. However, whether the host device 140-2 replies the ARP packet is a problem of probability. The present invention is to guarantee that the ARP packet can be replied correctly.

Refer to FIGS. 1-5. In the embodiment shown in FIGS. 1-5, while the host device 140-1 turns from the network device 120-2 to connect with the network device 120-1, the processor 164 of the control apparatus 160 determines whether the host device 140-1 moves and links to a different network device according to the packet issued by the host device 140-1, e.g. whether the host device 140-1 turns from the network device 120-2 to connect with the network device 120-1. Then, the network device 120-1, which has received the address resolution request packet, can use the Packet-In message of the OpenFlow protocol to package the address resolution request packet and directly sends the address resolution request packet to the control apparatus 160. The processor 164 of the control apparatus 160 receives the address resolution request packet sent out by the host device 140-1 and determines whether the host device 140-1 moves to a different subnetwork according to the address resolution request packet. Next, corresponding to the address resolution request packet, the processor 164 of the control apparatus 160 controls the network device 120-1 to return an address resolution response packet to the host device 140-1, whereby to maintain the IP address of the host device 140-1. The abovementioned address resolution response packet is an ARP response packet. After receiving the address resolution response packet, the host device 140-1 would not undertake the Layer-3 handover activity but would stay in the original IP address. Thus, even though the host device 140-1 turns from the network device 120-2 to connect with the network device 120-1, the IP address of the host device 140-1 would not change. Further, the technology that the control apparatus 160 assists in returning the address resolution response packet also achieves an effect of the ARP Proxy, which can avoid the problem of ARP Request Flooding that may occur in the cascaded network devices 120-1~120-4.

Figure 6:
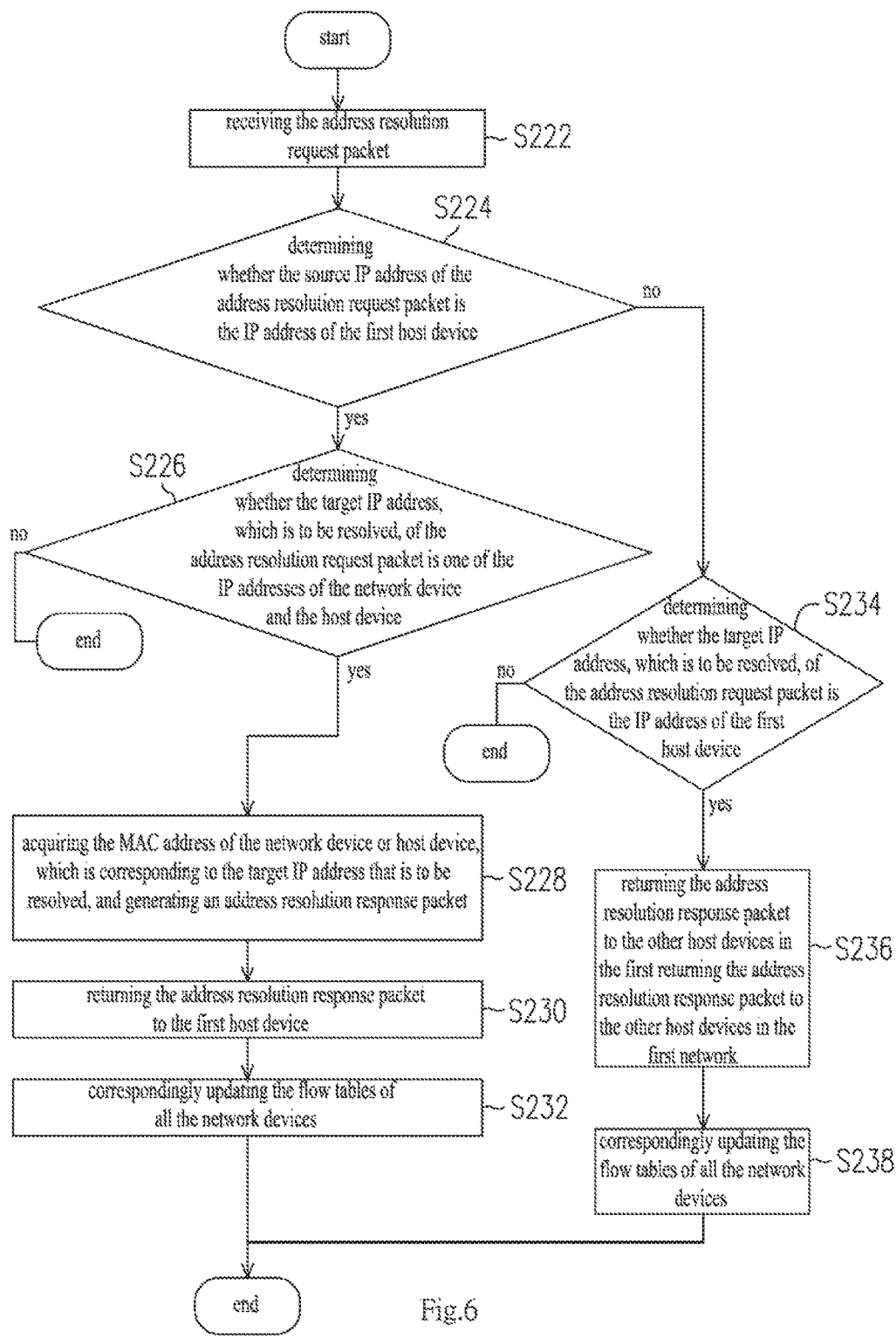
FIG. 6 is a flowchart of an operation method of a network system according to one embodiment of the present invention.

Refer to FIG. 6 a flowchart of an operation method of a network system according to one embodiment of the present invention. Below, the present invention will be exemplified with the embodiment that the control apparatus is used to determine whether the source IP address of the address resolution request packet is the IP address of the host device roaming to another subnetwork. However, the present invention is not limited by the embodiment. In another embodiment, the control apparatus determines whether the source MAC address of the address resolution request packet is the MAC address of the host device roaming to another subnetwork, whereby to learn which one of the host devices roams among different subnetworks. Refer to FIGS. 1-6 and related embodiments. While the host device 140-1 turns from the network device 120-2 to connect with the network device 120-1, i.e. the host device 140-1 moves from the first network of the network device 120-2 to the second network of the network device 120-1, the host device 140-1, the network device 120-2 in the first network or another host device in the first network sends out an address resolution request packet. It is particularly explained herein: the first network of the network device 120-2 is a subnetwork of the network device 120-2, and the second network of the network device 120-1 is a subnetwork of the network device 120-1.

Firstly, the network unit 162 of the control apparatus 160 receives the address resolution request packet through the network device 120-1 (Step S222). Next, the processor 164 of the control apparatus 160 determines the source IP address of the address resolution request packet. In the embodiment, before the host device 140-1 moves to the network device 120-1, the control apparatus 160 has recorded the IP address of the host device 140-1 when the host device 140-1 connects with the network device 120-2 at the first time. Therefore, while the control apparatus 160 receives the address resolution request packet corresponding to the fact that the host device 140-1 turns to connect with the network device 120-1, the processor 164 of the control apparatus 160 determines whether the source IP address of the address resolution request packet is the IP address of the host device 140-1, which the control apparatus 160 has recorded (Step S224).

If the source IP address of the address resolution request packet is the recorded IP address of the host device 140-1, i.e. the determination of Step S224 is yes, the processor 164 of the control apparatus 160 determines whether the target IP address, which is to be resolved, of the address resolution request packet is one of the IP addresses of the network device 120-2 and the host device 140-2 (Step S226). As mentioned above, while the host device 140-1 turns from the network device 120-2 to connect with the network device 120-1, the target IP address, which is to be resolved in the address resolution request packet issued by the host device 140-1, should be the network device 120-2. Therefore, if the processor 164 of the control apparatus 160 determines that the target IP address, which is to be resolved, of the address resolution request packet issued by the host device 140-1 is one of the IP addresses of the network device 120-2 and the host device 140-2, i.e. the determination of Step S226, is yes, the processor 164 of the control apparatus 160 acquires the MAC address of the network device or host device, which is corresponding to the target IP address that is to be resolved, and generates an address resolution response packet including the aforementioned MAC address (Step S228). For example, the processor 164 of the control apparatus 160 acquires the MAC address of the network device 120-2 and generates an address resolution response packet including the MAC address of the network device 120-2.

The network unit 162 of the control apparatus 160 returns the address resolution response packet to the host device 140-1 through the network device 120-1 (Step S230). For example, the control apparatus 160 uses the Packet-Out message of the OpenFlow protocol to send the address resolution response packet to the network device 120-1, and the network device 120-1 further returns the address resolution response packet to the host device 140-1. Thereby, after the host device 140-1 receives the address resolution response packet, the original IP address of the host device 140-1 is maintained unchanged. The processor 164 of the control apparatus 160 updates the flow tables of all the network devices 120-1~120-4 correspondingly (Step S232) so as to guide all the packets going to the host device 140-1 to the host device 140-1 in the second network, whereby the transmission path of the host device 140-1 is kept up in the network system 100. It should be noted: in the embodiment, if the processor 164 of the control apparatus 160 determines that the target IP address, which is to be resolved, of the address resolution request packet is neither the IP address of the network device 120-2 nor the IP address of the host device 140-2, i.e. the determination of Step S226 is no, none address resolution response packet will be returned, and the process of the operation method is ended. On the other hand, if the processor 164 of the control apparatus 160 determines that the source IP address of the address resolution request packet is not the IP address of the host device 140-1, i.e. the determination of Step S224 is no, the processor 164 of the control apparatus 160 further determines whether the target IP address, which is to be resolved, of the address resolution request packet is the IP address of the first host device 140-1 (Step S234), whereby to process the address resolution requests made by other host devices in the first network to query about the host device 140-1 having roamed to the second network. If the determination of Step S234 is no, none address resolution response packet will be returned, and the process of the operation method corresponding to the host device 140-1 is ended.

If the target IP address, which is to be resolved, of the address resolution request packet is the IP address of the first host device 140-1, i.e. the determination of Step S234 is yes, the processor 164 of the control apparatus 160 takes the place of the host device 140-1 to return the address resolution response packet to the first network (Step S236). Further, the processor 164 of the control apparatus 160 correspondingly updates the flow tables of all the network devices 120-1~120-4 (Step S238), whereby to maintain the transmission paths between the host device 140-1 and the other network host devices in the first network of the network system 100.

Refer to FIG. 6. The network unit 162 of the control apparatus 160 receives the address resolution request packet through the network device 120-1 (Step S222), and the processor 164 of the control apparatus 160 determines whether the address resolution request packet is sent out by the first host device. As mentioned above, in the embodiment, the host device 140-1 turns from the network device 120-2 to connect with the network device 120-1 and thus moves from the subnetwork of the network device 120-2 to the subnetwork of the network deice 120-1. Therefore, it is in fact to determine whether the source IP address of the address resolution request packet is the IP address of the host device 140-1 (Step S224).

Then, the network unit 162 of the control apparatus 160 returns the address resolution response packet to the host device 140-1 through the network device 120-1 (Step S230). The processor 164 of the control apparatus 160 correspondingly updates the flow tables of all the network devices 120-1~120-4 (Step S232), whereby to maintain the transmission path of the host device 140-1 in the network system 100. According to the above description, the control apparatus 160 determines whether the host device 140-1 moves via observing the source MAC address issued by the host device 140-1. Therefore, the control apparatus 160 can detect the movement of the host device 140-1, neither unpacking the packet nor comparing IP addresses. The control apparatus 160 will generate the ARP response and directly transmit the ARP response to the host device 140-1 through the new subnetwork. Corresponding to reception of the ARP response, the host device 140-1 would not undertake the Layer-3 handover activity but continues using the original IP address to maintain the TPC network connection. Thus, it is unnecessary to transmit the succeeding packets through the subnetwork used previously. The control apparatus 160 can dynamically arrange the optimized or shortest route for packets.

Figure 7:
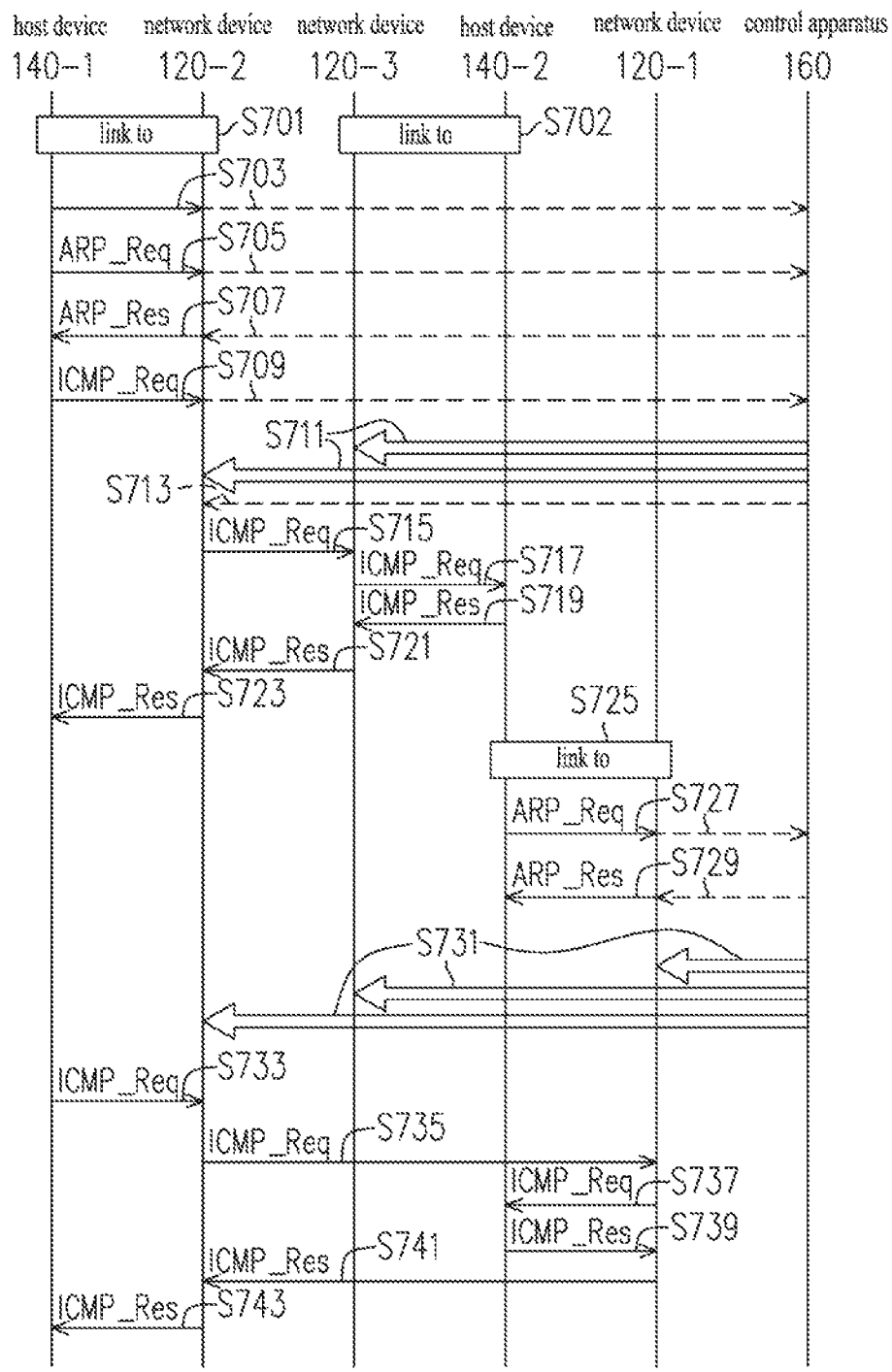
FIG. 7 is a diagram schematically showing signal transmission of a network system according to one embodiment of the present invention.

FIG. 7 is a diagram schematically showing the signal transmission of the network system according to one embodiment of the present invention. Refer to FIGS. 1-7. In the network system 100, while the host device 140-1 connects with the network device 120-2 of the network system 100 at the first time (Step S701), the control apparatus 160 uses the first packet sent out by the host device 140-1 to the network device 120-2 to verify the existence of the host device 140-1 (Step S703). On the other hand, the host device 140-2 connects with the network device 120-3 (Step S702).

Suppose that host device 140-1 intends to communicate with the host device 140-2 and that the host device 140-1 and the host device 140-2 are located in the same subnetwork. The host device 140-1 sends an address resolution request packet ARP Req to the network device 120-2. The target IP address, which is to be resolved, of the address resolution request packet is the IP address of the host device 140-2. The control apparatus 160 receives the address resolution request packet ARP Req through the network device 120-2 (Step S705). As the host device 140-1 connects with the network system 100 for the first time, the control apparatus 160 controls the network device 120-2 to return an address resolution response packet ARP Res (Step S707). If the host device 140-1 and the host device 140-2 are respectively located in different subnetworks, the process is free of the abovementioned step.

After the host device 140-1 has connected with the network system 100, the host device 140-1 can transfer packets to the other host devices, such as the host device 140-2. Herein, the host device 140-1 undertakes the PING process with the host device 140-2 being the target. In the embodiment, the host device 160 undertakes the PING process to send an Internet control message request packet to the host device 140-2 according to the lookup table in the address resolution response packet ARP Res. The abovementioned Internet control message request packet is an ICMP (Internet Control Message Protocol) request packet.

The network device 120-2 and the control apparatus 160 receive the Internet control message request packet ICMP Req sent out by the host device 140-1 (Step S709). After receiving the abovementioned Internet control message request packet ICMP Req, the control apparatus 160 sets the transmission route between the host device 140-1 and the host device 140-2 correspondingly (Step S711). In the embodiment, setting the transmission route includes updating the flow tables of the network devices 120-2 and the 120-3.

Next, the control apparatus 160 instructs the network device 120-2 to transmit the Internet control message request packet ICMP Req (Step S713). The network device 120-2 transmits the Internet control message request packet ICMP Req to the network device 120-3 (Step S715). The network device 120-3 further transmits the Internet control message request packet ICMP Req to the host device 140-2 (Step S717). After receiving the Internet control message request packet ICMP Req, the host device 140-2 returns an Internet control message response packet correspondingly. The Internet control message response packet is an ICMP (Internet Control Message Protocol) response packet.

In detail, the host device 140-2 transmits the Internet control message response packet ICMP Res to the network device 120-3 (Step S719), and the network device 120-3 transmits the Internet control message response packet ICMP Res to the network device 120-2 (Step S721). The network device 120-2 further transmits the Internet control message response packet ICMP Res to the host device 140-1 (Step S723). Thus, the PING process, which the host device 140-1 performs on the host device 140-2, is completed.

After a period of time, while the host device 140-2 turns to connect with the network device 120-1 (Step S725), the host device 140-2 uses the IP address of the network device 120-3 as the target IP address that is to be resolved and transmits an address resolution request packet ARP Req to enable the control apparatus 160 to determine whether the host device 140-2 is still in the original subnetwork. The network device 120-1 and the control apparatus 160 receive the abovementioned address resolution request packet ARP Req (Step S727). According to the IP address and MAC address of the network device 120-3, the control apparatus 160 generates an address resolution response packet ARP Res and controls the network device 120-1 to return the address resolution response packet ARP Res (Step S729), so as to maintain the IP address of the host device 140-2. Next, the control apparatus 160 updates the flow tables of the network devices 120-1~120-4 (Step S731).

After the abovementioned handover activity has been completed, and while the host device 140-1 undertakes a PING process with the host device 140-2 being the target, the Internet control message request packet ICMP Req and the Internet control message response packet ICMP Res are transmitted by the network devices 120-1 and 120-2 (Steps S733, S735, S737, S739, S741 and S743). In detail, after the host device 140-2 moves, the control apparatus 160 generates and returns the address resolution response packet ARP Res to make the host device 140-2 deem that it is still under the original network device 120-3, whereby to keep the original IP address of the host device 140-2. Besides, the flow tables are modified to correct the target MAC addresses of packets, whereby to prevent the network devices from discarding the packets labelled as the packets of different subnetworks, and whereby to guarantee that packets can be correctly transmitted.

Figure 8:
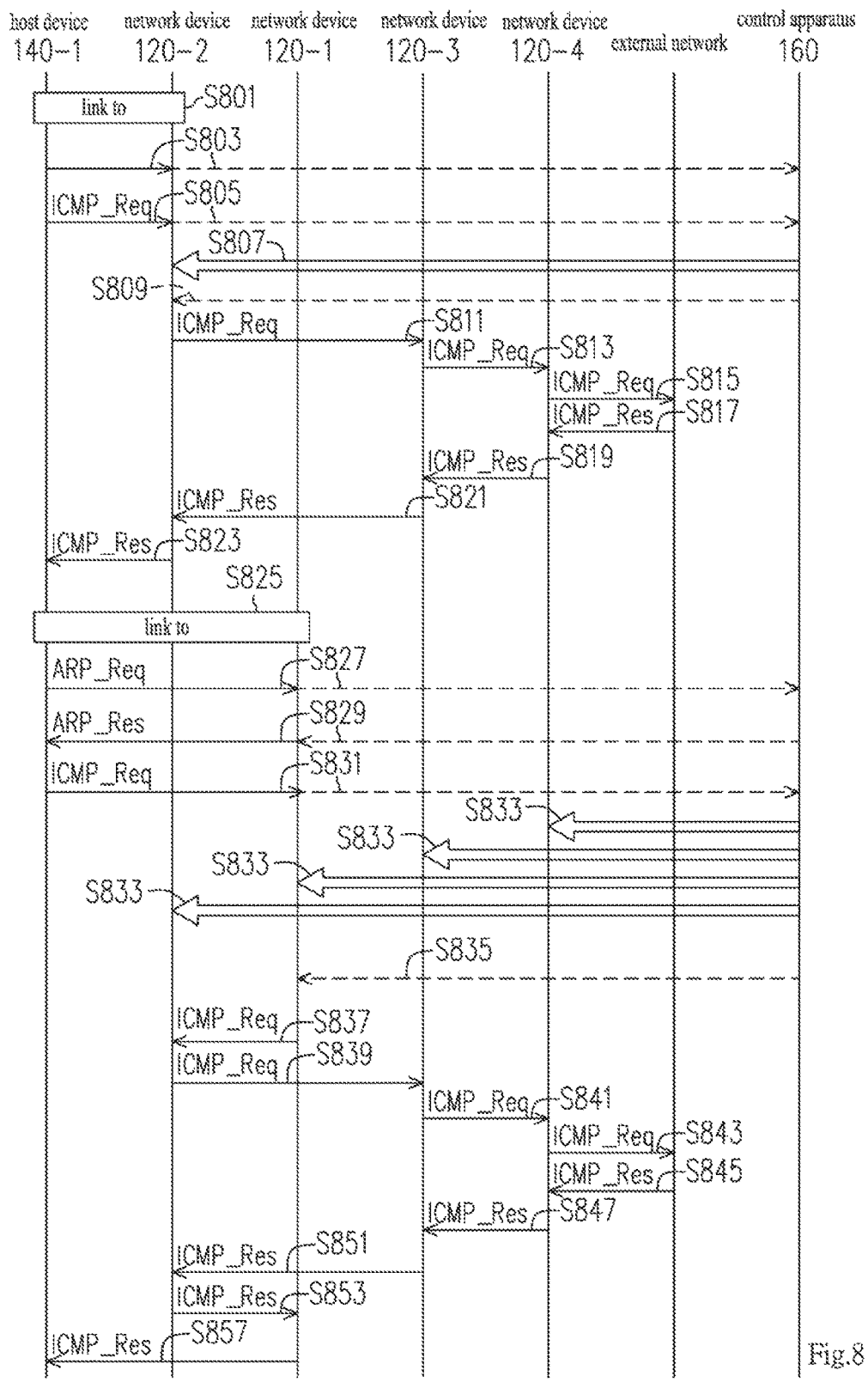
FIG. 8 is a diagram schematically showing signal transmission of a network system according to another embodiment of the present invention.

FIG. 8 is a diagram schematically showing the signal transmission of the network system according to another embodiment of the present invention. The embodiment shown in FIG. 8 is different from the embodiment shown in FIG. 7 in that FIG. 8 illustrates the signal transmission between the devices of external networks and the host device 140-1. Refer to FIGS. 1-8. In the embodiment, the host device 140-1 connects with the network device 120-2 (Step S801). The control apparatus 160 uses the first packet transmitted by the host device 140-1 to the network device 120-2 to verify the existence of the host device 140-1 (Step S803). If the host device 140-1 connects with the network device 120-2 for the first time, the address resolution request packet ARP Req and the address resolution response packet ARP Res are required for acquiring the IP address. However, the process that has been described above will not repeat herein.

After connecting with the network system 100, the host device 140-1 can also transmit packets to an arbitrary device of the external network. For example, the host device 140-1 undertakes a PING process with an arbitrary device in the external network being the target. In the embodiment, the host device 140-1 sends an Internet control message request packet to an arbitrary device in the external network to undertake a PING process. The abovementioned Internet control message request packet is an ICMP (Internet control message protocol) request packet.

In the embodiment, the network device 120-4 connects with an external network. If the host device 140-1 intends to perform a PING process on a host device in the external device, the host device 140-1 sends out an Internet control message request packet ICMP Req, and the network device 120-2 and the control apparatus 160 receive the Internet control message request packet ICMP Req (Step S805). After receiving the Internet control message request packet ICMP Req, the control apparatus 160 sets the transmission path between the host device 140-1 and the network device 120-4 correspondingly (Step S807). For example, the control apparatus 160 updates the flow table of the network device 120-2.

Next, the control apparatus 160 instructs the network device 120-2 to transmit the Internet control message request packet ICMP Req (Step S809). The network device 120-2 transmits the Internet control message request packet ICMP Req to the network device 120-3 (Step S811), and the network device 120-3 further transmits the Internet control message request packet ICMP Req to the network device 120-4 (Step S813). After receiving the Internet control message request packet ICMP Req, the network device 120-4 transmits the Internet control message request packet ICMP Req to a device in the external network (Step S815).

After receiving the Internet control message request packet ICMP Req, the device in the external network returns an Internet control message response packet correspondingly. The Internet control message response packet is an ICMP (Internet Control Message Protocol) response packet. In detail, the external network sends the Internet control message response packet ICMP Res to the network device 120-4 (Step S817); the network device 120-4 sends the Internet control message response packet ICMP Res to the network device 120-3 (Step S819); the network device 120-3 sends the Internet control message response packet ICMP Res to the network device 120-2 (Step S821); the network device 120-2 sends the Internet control message response packet ICMP Res to the host device 140-1 (Step S823). Thus, the PING process, which the host device 140-1 performs on an arbitrary device in the external network, is completed.

After a period of time, while the host device 140-1 turns to connect with the network device 120-1 (Step S825), the host device 140-1 uses the IP address of the network device 120-2 as the target IP address that is to be resolved and transmits an address resolution request packet ARP Req according to the target IP address. The network device 120-1 and the control apparatus 160 receive the address resolution request packet ARP Req (Step S827). The control apparatus 160 generates an address resolution response packet ARP Res according to the IP address and MAC address of the network device 120-2 and controls the network device 120-1 to return the address resolution response packet ARP Res (Step S829), whereby the host device 140-1 still uses the original IP address. The control apparatus 160 can determine when to modify the flow tables of the network devices 120-1, 120-2, 120-3, and 120-4. The control apparatus 160 may modify the flow tables when new traffic appears. Alternatively, the control apparatus 160 immediately modifies the flow tables after the address resolution response packet ARP Res is completed and when the host device 140-1 is currently communicating with the other host devices. While the host device 140-1 undertakes a PING process with an arbitrary device as the target after the abovementioned handover process is completed, the host device 140-1 sends an Internet control message request packet ICMP Req, and the network device 120-1 and the control apparatus 160 receive the Internet control message request packet ICMP Req (Step S831). The control apparatus 160 updates the flow tables of all the network devices 120-1, 120-2, 120-3 and 120-4 in the route (Step S833) and instructs the network devices 120-1, 120-2, 120-3 and 120-4 to transmit the Internet control message request packet ICMP Req (Step S835). Next, the Internet control message request packet ICMP Req and the Internet control message response packet ICMP Res are transmitted by the network devices 120-1, 120-2, 120-3 and 120-4 (Steps S837, S839, S841, S843, S845, S847, S849, S851, S853, and S857).

In conclusion, the present invention provides a network system with a seamless handover mechanism, an operation method and a control apparatus thereof, wherein the network system is programmed to make all the wireless access networks have an identical service set identifier (SSID), and wherein the form of the backbone of the network system is not particularly limited. While a host device turns from the originally-connected network device to connect with another network device, the control apparatus controls the network device to return an address resolution response packet to a first host device corresponding to the address resolution request packet issued by the abovementioned host device, whereby to keep the IP address of the first host device. Thereby, the handover process undertaken by the host device is exempted from the Layer-3 handover operation. Thus, the time spent in handover procedures is decreased, and the probability of packet loss in handover procedures is lowered.

The present invention has been demonstrated above with the embodiments. However, these embodiments are only to exemplify the present invention but not to limit the scope of the present invention. Any person skilled in the art should be able to modify or vary the embodiments easily without departing from the scope of the present invention, which is based on the claims stated below.

What is claimed is:

1. A network system with a seamless handover mechanism, comprising:
 a plurality of network devices based on a software-defined network (SDN), and said network devices interconnect, and a portion of said network devices provide wireless access networks, and said wireless access networks have an identical service set identifier (SSID);
 a plurality of host devices each connecting with one of said network devices providing said wireless access networks; and
 a control apparatus connecting with said network devices, and while a first host device of said host devices turns from a first network device of said network devices to connect with a second network device and moves from a first network of said first network device to a second network of said second network device, said control apparatus controls said network devices to return an address resolution response packet to said first host device corresponding to an address resolution request packet issued by said first host device to keep an Internet protocol (IP) address of said first host device;
 wherein while said control apparatus receives said address resolution request packet from said second network device, said control apparatus determines whether a source media access control (MAC) address or a source IP address of said address resolution request packet is an MAC address of said first host device or an IP address of said first host device; when said source MAC address of said address resolution request packet is said MAC address of said first host device or said source IP address of said address resolution request packet is said IP address of said first host device, said control apparatus determines whether a target IP address, which is to be resolved, of said address resolution request packet is an IP address of one of network devices and host devices in said first network; and when said target IP address, which is to be resolved, of said address resolution request packet is said IP address of one of said network devices and said host devices in said first network, said control apparatus acquires an MAC address corresponding to said target IP address, which is to be resolved, of said address resolution request packet and generates said address resolution response packet of said MAC address, and said control apparatus returns said address resolution response packet to said first host device through said second network device.

2. The network system according to claim 1, wherein said network devices include an external-connection router device connecting with an external network, and wherein while a target IP address of a packet belongs to an IP address of said external network, said network devices transmit said packet to said external-connection router device, and said external-connection router device transmits said packet to said external network.

3. The network system according to claim 1, wherein after returning said address resolution response packet to said first host device, said control apparatus updates flow tables of said network devices to guide all packets going to said first host device to said first host device in said second network.

4. The network system according to claim 1, wherein while said control apparatus receives another address resolution request packet through said first network device, said control apparatus determines whether a target IP address, which is to be resolved, of said another address resolution request packet is said IP address of said first host device; and when said target IP address, which is to be resolved, of said another address resolution request packet is said IP address of said first host device, said control apparatus places an MAC address of said first host device in another address resolution response packet and returns said another address resolution response packet through said first network device.

5. The network system according to claim 4, wherein after returning said another address resolution response packet to said first network, said control apparatus correspondingly updates flow tables of all said network devices to guide all packets going to said first host device to said first host device in said second network.

6. An operation method of a network system, wherein said network system includes a plurality of network devices based on a software-defined network (SDN), a plurality of host devices and a control apparatus, and said network devices interconnect, and a portion of said network devices provide wireless access networks, and said wireless access networks have an identical service set identifier (SSID), and each of said host devices connects with one of said network devices providing said wireless access networks, and said control apparatus connects with said network devices, and said operation method comprises:
 while a first host device of said host devices turns from a first network device of said network devices to connect with a second network device and moves from a first network of said first network device to a second network of said second network device, said first host device sends out an address resolution request packet; and
 corresponding to said address resolution request packet, said control apparatus controls said network devices to return an address resolution response packet to said first host device to keep an IP address of said first host device;
wherein said step of controlling said network devices to return said address resolution response packet to said first host device to keep said IP address of said first host device further comprises steps:
said control apparatus receiving said address resolution request packet through said second network device;
said control apparatus determining whether a source media access control (MAC) address or a source IP address of said address resolution request packet is an MAC address of said first host device or an IP address of said first host device;
if said source MAC address of said address resolution request packet is said MAC address of said first host device or said source IP address of said address resolution request packet is said IP address of said first host device, said control apparatus determining whether a target IP address, which is to be resolved, of said address resolution request packet is an IP address of one of network devices and host devices in said first network;
if said target IP address, which is to be resolved, of said address resolution request packet is said IP address of one of said network devices and said host devices in said first network, said control apparatus acquiring an MAC address corresponding to said target IP address, which is to be resolved, of said address resolution request packet and generating said address resolution response packet of said MAC address; and
said control apparatus returning said address resolution response packet to said first host device through said second network device.

7. The operation method according to claim 6, further comprising:
after returning said address resolution response packet to said first host device, said control apparatus updating flow tables of said network devices to guide all packets going to said first host device to said first host device in said second network.

8. The operation method according to claim 6, further comprising:
said control apparatus receiving another address resolution request packet through said first network device;
said control apparatus determining whether a target IP address, which is to be resolved, of said another address resolution request packet is said IP address of said first host device; and
if said target IP address, which is to be resolved, of said another address resolution request packet, is said IP address of said first host device, said control apparatus placing an MAC address of said first host device in another address resolution response packet and returning said another address resolution response packet through said first network device.

9. The operation method according to claim 8, wherein after returning said another address resolution response packet to said first network, said control apparatus correspondingly updating flow tables of all said network devices to guide all packets going to said first host device to said first host device in said second network.

10. A control apparatus applicable to a network system, and said network system includes a plurality of network devices based on a software-defined network (SDN) and a plurality of host devices, and said network devices interconnect, and a portion of said network devices provide wireless access networks, and said wireless access networks have an identical service set identifier (SSID), and each of said host devices connects with one of said network devices providing said wireless access networks, and said control apparatus comprises
a network unit connecting with said network devices; and
a processor coupled to said network unit, wherein while a first host device of said host devices turns from a first network device of said network devices to connect with a second network device and moves from a first network of said first network device to a second network of said second network device, said control apparatus controls said network devices to return an address resolution response packet to said first host device corresponding to an address resolution request packet issued by said first host device to keep an Internet protocol (IP) address of said first host device;
wherein while said control apparatus receives said address resolution request packet from said second network device, said control apparatus determines whether a source media access control (MAC) address or a source IP address of said address resolution request packet is an MAC address of said first host device or an IP address of said first host device; when said source MAC address of said address resolution request packet is said MAC address of said first host device or said source IP address of said address resolution request packet is said IP address of said first host device, said control apparatus determines whether a target IP address, which is to be resolved, of said address resolution request packet is an IP address of one of network devices and host devices in said first network; and when said target IP address, which is to be resolved, of said address resolution request packet is said IP address of one of said network devices and said host devices in said first network, said control apparatus acquires an MAC address corresponding to said target IP address, which is to be resolved, of said address resolution request packet and generates said address resolution response packet of said MAC address, and said control apparatus returns said address resolution response packet to said first host device through said second network device.

* * * * *